United States Patent [19]

Leyrer et al.

[11] Patent Number: 5,100,971
[45] Date of Patent: Mar. 31, 1992

[54] PREPARATION OF CARBAZOLE-SUBSTITUTED POLYACRYLATES OR POLYMETHACRYLATES, THE PRODUCTS THUS PREPARED AND THEIR USE

[75] Inventors: Reinhold J. Leyrer, Ludwigshafen; Harald Lauke, Mannheim; Peter Strohriegl, Hummeltal; Dietrich Haarer, Bayreuth, all of Fed. Rep. of Germany

[73] Assignee: BASF Aktiengesellschaft, Ludwigshafen, Fed. Rep. of Germany

[21] Appl. No.: 476,877

[22] Filed: Feb. 8, 1990

[30] Foreign Application Priority Data

Feb. 28, 1989 [DE] Fed. Rep. of Germany ....... 3906246

[51] Int. Cl.$^5$ ................................................ C08F 8/30
[52] U.S. Cl. .................................. 525/366; 525/329.9; 525/367; 525/368; 525/369; 525/375
[58] Field of Search ................................ 525/375, 366

[56] References Cited

U.S. PATENT DOCUMENTS 3,243,476  3/1966  Black et al. .......................... 260/857

OTHER PUBLICATIONS

Hu et al., J. of Polymer Sci.: Part C, vol. 26, 441-446 (1988).

American Chemical Society, 20, 212-216 (1983).
Hole Transprt Property of Poly (2-N-Carbazolylethyl Methacrylate) Oshima et al., Jour. of Poly. Sci. Polymer Ltrs Ed. vol. 23, 151-154 (1985).
Improved Hole Mobility of Polyacrylate Having a Carbazole Chromophore Macromolecules 1984, 18, 1043-1045.
Synthesis and High Hole Mobility of Isotactic Poly (2-N-Carbazolylethyl Acrylate, Uryu et al., Macromolecules 1987, 20, 712-716.
The Synthesis and Polymerization Studies of Some Higher Homologues of 9-Vinylcarbazole, Heller et al., 48-59.
Hydroboration XXXVI A Direct Route to 9-Borabicyclo[3.3.1]Nonane via the Cyclic Hydroboration of 1,5 . . . Brown et al., Journal of the American Chemical Society/96:25/Dec. 11, 1974.

*Primary Examiner*—Bernard Lipman
*Attorney, Agent, or Firm*—Keil & Weinkauf

[57] ABSTRACT

For the preparation of acrylate and/or methacrylate polymers containing carbazolyl side groups, polymers of acryloyl chloride and/or of methacryloxyl chloride are subjected to a polymer-analogous reaction in solution with alcoholates of N-($\omega$-hydroxyalkyl)-carbazoles. The poly(meth)acrylates containing carbazolyl side groups and prepared in this manner have good photoconductor properties and can advantageously be used in electrophotographic recording elements.

13 Claims, No Drawings

PREPARATION OF CARBAZOLE-SUBSTITUTED POLYACRYLATES OR POLYMETHACRYLATES, THE PRODUCTS THUS PREPARED AND THEIR USE

The present invention relates to a process for the preparation of acrylate and/or methacrylate polymers which contain carbazolyl side groups and are suitable as photoconductive compounds for use in solid, photoconductive layers. The present invention furthermore relates to the use of the products prepared by the novel process in electrophotographic recording elements having an electrically conductive substrate and a solid, photoconductive layer.

Solid, photoconductive layers containing a photoconductive organic compound are of increasing interest for electrophotographic recording materials, such as copying films or electrophotographic offset printing plates. Polymeric materials are preferred as organic photoconductors which are used in the said layers. Among the known polymeric photoconductive compounds, poly-N-vinylcarbazole is particularly important because of its good properties as a photoconductor. In addition to poly-N-vinylcarbazole, other N-carbazolyl-containing polymers have, particularly recently, attracted a certain amount of attention with regard to the investigation of their photoconductor properties.

For example, Journ. Polym. Sci., Polym. Letters Ed. 23 (1985), 151–154 and Macromolecules 18 (1985), 1043–1045 state that, despite the lower content of carbazole chromophores, the hole transport properties of poly-(2-N-carbazolylethyl methacrylate) prepared by free radical polymerization are similar to those of poly-(N-vinylcarbazole), whereas the hole transport properties of poly-(2-N-carbazolylethyl acrylate) prepared by free radical polymerization are even an order of magnitude better. According to Macromolecules 20 (1986), 712–716, the hole transport properties of anionically polymerized, isotactic poly-(2-N-carbazolylethyl acrylate) are even better than those of the atactic polyacrylate, so that these polymers appear very interesting as photoconductors in electrophotographic recording materials.

The known poly-(2-N-carbazolylethyl acrylates) and poly-(2-carbazolylethyl methacrylates) were prepared to date by polymerization of monomeric 2-(N-carbazolyl)ethyl acrylate or methacrylate. These monomers are prepared as a rule by reacting N-(2-hydroxyethyl)carbazole with acryloyl chloride or methacryloyl chloride and have to be carefully freed from impurities, for example unreacted (meth)acryloyl chloride, before their polymerization, since otherwise the photoconductor properties of the poly(meth)acrylates prepared therefrom may be adversely affected. Furthermore, it has been found that the variation of the molecular weight of the poly-(2-N-carbazolylethyl acrylates) or poly-(N-carbazolylethyl methacrylates) is limited in this process. These known poly(meth)acrylates containing carbazolyl side groups also have the disadvantage, like poly-N-vinylcarbazole, that they are brittle and have poor flexibility and inadequate adhesion properties and are therefore suitable only to a limited extent for use in electrophotographic recording elements which are subjected to high bending stress, as occurs, for example, when electrophotographic recording elements are clamped on drums or cylinders.

Furthermore, the publication by Chau-Jin Hu et al., Synthesis and Photoinduced Discharge of Polyacrylates with Pendant Carbazole Group in Journal of Polymer Science, Part C: Polymer Letters, 26 (1988), 441–446, discloses a process for the preparation of polyacrylates of the formula (IIa)

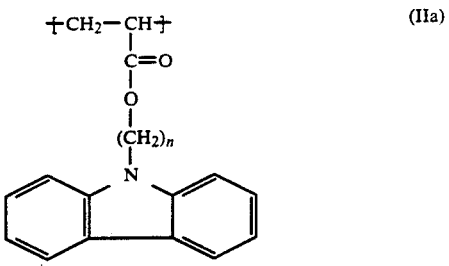

where n is 2, 3, 4, 5, 6 or 8, in which the relevant N-(ω-carbazolylalkyl) acrylates are first prepared from the N-(ω-bromoalkyl)-carbazoles and sodium acrylate and are then subjected to free radical polymerization.

It is an object of the present invention to provide a process for the preparation of polyacrylates or polymethacrylates containing carbazolyl side groups, which process can be carried out in a simple manner and leads to products which can advantageously be used as photoconductors in electrophotographic recording elements, in particular electrophotographic offset printing plates.

We have found that this object is achieved, surprisingly, if N-(ω-hydroxyalkyl)-carbazoles are subjected to a polymer-analogous reaction with poly(meth)acryloyl chlorides.

The present invention accordingly relates to a process for the preparation of acrylate and/or methacrylate polymers containing carbazolyl side groups, wherein a polymer of the acryloyl chloride and/or methacryloyl chloride is subjected to a polymer-analogous reaction in solution with an alcoholate, in particular an alkali metal alcoholate, of an N-(ω-hydroxyalkyl)carbazole and the reaction product is then isolated from this solution.

The present invention furthermore relates to the poly(meth)acrylates containing carbazolyl side groups and obtained by this process, as described in detail below.

The present invention also relates to electrophotographic recording elements containing an electrically conductive substrate and a photoconductive layer, which contain, as a photoconductor in the photoconductive layer, the poly(meth)acrylates containing carbazolyl side groups and prepared by the novel process.

The novel process leads to products of high purity without special and expensive purification steps being required for this purpose. Although polymeranalogous reactions are generally difficult to carry out in a reproducible manner and accordingly frequently lead to impure products and undesirable secondary reactions, we have found, surprisingly, that the novel reaction takes place smoothly and without problems and can be used to prepare, in a controlled and reproducible manner, poly(meth)acrylates containing carbazolyl side groups and having the desired properties. An advantage of the novel process is that it permits better variation of the molecular weights of the end products and in particular allows relatively high molecular weight products to be prepared more easily than by the conventional process, by polymerization of monomeric N-carbazolylalkyl acrylates or N-carbazolylalkyl methacrylates. Many of the products prepared according to the invention by polymer-analogous reaction are more resilient and more flexible than the corresponding ones prepared by polymerization of the corresponding acrylates and methacrylates containing N-carbazolylalkyl groups. The poly(meth)acrylates containing carbazolyl side groups and prepared according to the invention have good photoconductor properties and can advantageously be used in particular for electrophotographic recording elements which are suitable for clamping on drums or cylinders.

Starting components of the novel process are polymers of acryloyl chloride and/or methacryloyl chloride. Poly(acryloyl chloride) and poly(methacryloyl chloride) are used in particular for this purpose. However, it is also possible in principle to employ copolymers of acryloyl chloride and of methacryloyl chloride with one another as starting components or copolymers which, in addition to acryloyl chloride and/or methacryloyl chloride, contain further comonomers in minor amounts, i.e. in general less than 40, in particular less than 20, % by weight, based on the copolymer, as polymerized units. Examples of suitable further comonomers of this type are alkyl acrylates or alkyl methacrylates where the alkyl radical is of, for example, 1 to 8 carbon atoms, as well as, for example, acrylic acid and/or methacrylic acid.

The (meth)acryloyl chloride polymers which serve as a starting material for the novel process are known as such and can be prepared by the conventional methods, for example by free radical polymerization of acryloyl or methacryloyl chloride with or without further comonomers. An appropriate polymerization process is described in, for example, Makromolekulare Chemie 42 (1960) 189. The molecular weight of the (meth)acryloyl chloride polymers used as starting components in the novel process may vary within wide limits; however, it should be sufficiently high to ensure that the end products resulting in the novel process are solid and non-tacky at room temperature. (Meth)acryloyl chloride polymers which are preferred starting materials are therefore those which have a very high molecular weight, in particular a weight average molecular weight of more than 50,000.

The (meth)acryloyl chloride polymers are reacted according to the invention with alcoholates of N-(ω-hydroxyalkyl)-carbazoles. In particular, N-(ω-hydroxyalkyl)-carbazoles where the alkyl radical is of 2 to 11, in particular 3 to 8, carbon atoms are used as starting materials. The N-(ω-hydroxyalkyl)-carbazoles used for the novel process are preferably of the formula

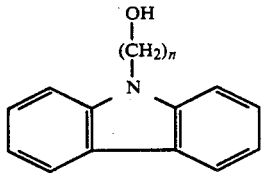

where n is an integer from 2 to 11, in particular from 3 to 8.

For the reaction with the (meth)acryloyl chloride polymers, the N-(ω-hydroxyalkyl)-carbazoles are converted by conventional methods into the corresponding alcoholates, in particular the alkali metal alcoholates, for example the alcoholate of lithium or of sodium. The reaction of the N-(ω-hydroxyalkyl)-carbazoles with butyllithium in an anhydrous solvent, for example in an ether, such as tetrahydrofuran or the like, has proven particularly simple and advantageous for the preparation of the alcoholates under discussion.

The preparation of N-(ω-hydroxyalkyl)-carbazoles is known and is described in the relevant technical literature. It can be carried out starting from carbazole, for example in accordance with the following equation:

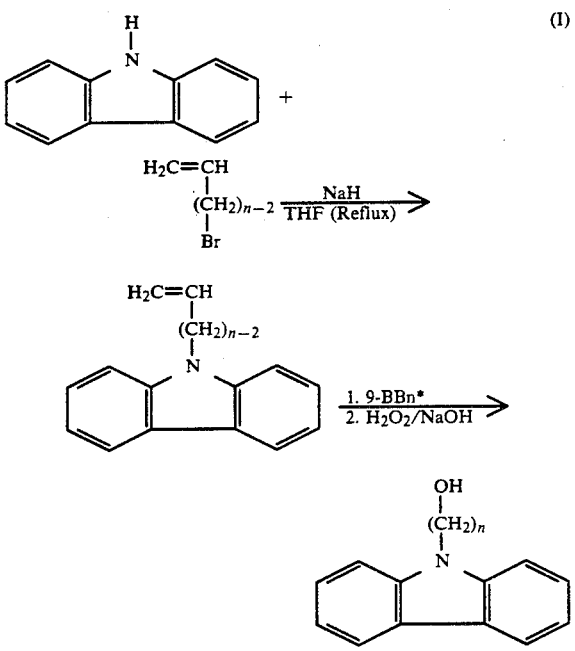

According to this equation, carbazole is reacted with the corresponding ω-alkenyl bromide to give the N-alkenylcarbazole. This reaction can be carried out, for example, by the methods described by J. Heller, D. J. Lyman and W. A. Hewett, Makromolekulare Chemie, 73 (1964), 48. The corresponding alcohols of the general formula (I) are obtained from the N-alkenylcarbazoles, for example by hydroboration with 9-borabicyclo[3.3.1-]nonane (9-BBN). The hydroboration reaction can be carried out similarly to a method described by H. C. Brown, E. F. Knights and G. G. Scouten, J. Am. Chem. Soc. 96 (1974), 7765. Another method for the preparation of N-(ω-hydroxyalkyl)-carbazoles is described in, for example, the literature cited at the outset, i.e. Macromolecules 20 (1987), 712–716.

The polymer-analogous reaction of the alcoholates of the N-(ω-hydroxyalkyl)-carbazoles with the (meth)acryloyl chloride polymers is carried out under anhydrous conditions in solution by combining the components and stirring. Suitable solvents are the conventional organic, anhydrous solvents which are inert to the reactants. Examples of such solvents are the ethers, such as tetrahydrofuran. Although the reaction between the alcoholates under discussion and the (meth)acryloyl chloride polymers can also be carried out at elevated temperatures, this has not proven necessary or advantageous; instead, the reaction is usually carried out at room temperature. The reaction is generally complete after a few hours. If poly(acryloyl chloride) is used as the starting material in the novel process, the alcoholates of N-(ω-hydroxyalkyl)-carbazoles of the general formula (I) where n is an integer of from 3 to 10, in particular from 3 to 6, are preferably used for the reaction. If poly(methacryloyl chloride) is used as the starting component in the novel process, the polymer-analogous reaction is preferably carried out with alcoholates of N-(ω-hydroxyalkyl)-carbazoles of the formula (I) where n is an integer of from 4 to 11, in particular from 4 to 7.

The (meth)acryloyl chloride polymers and the alcoholates of the N-(ω-hydroxyalkyl)-carbazoles are usually used in such proportions, and the reaction is carried out in such a way, that essentially all acyl chloride groups of the (meth)acryloyl chloride polymers have reacted with the alcoholates with formation of the corresponding carbazolylalkyl ester groups. The polymer-analogous reaction can, however, also be carried out in such a way that a certain amount of the acyl chloride groups of the (meth)acryloyl chloride polymers, for example from 5 to 20% of these acyl chloride groups, do not react with the alcoholates but remain as acyl chloride groups in the reaction product. Even when the reaction of the acyl chloride groups of the (meth)acryloyl chloride polymers with the alcoholates is carried out essentially completely, the end product frequently still contains a small amount, usually not more than 3%, of unconverted acyl chloride groups. The acyl chloride groups remaining in the polymeric reaction product of the polymer-analogous reaction can be hydrolyzed when the said reaction product is worked up and can be converted into COOH groups. This gives poly(meth)acrylates which contain carbazolyl side groups and, in addition to repeating N-carbazolylalkyl (meth)acrylate units, also contain a small amount of (meth)acrylic acid units.

The poly(meth)acrylates containing carbazolyl side groups and prepared by the novel process can be isolated from the reaction solution by conventional methods, for example by precipitating the polymers with a nonsolvent, for example a lower alkanol, and filtering off the precipitated polymers. The product thus obtained can, if desired, be reprecipitated for purification.

The poly(meth)acrylates containing carbazolyl side groups and prepared by the novel process accordingly preferably contain repeating units of the formula

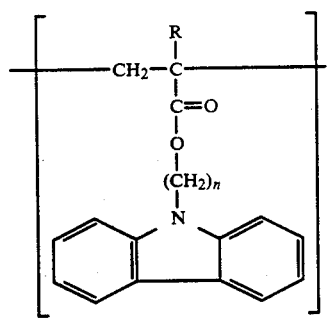

(II)

or consist thereof. In the formula (II), R is hydrogen or methyl and n is an integer of from 2 to 11, in particular from 3 to 8. It is particularly advantageous if n is an integer of from 3 to 10, in particular from 3 to 6, when R is hydrogen, and n is an integer of from 4 to 11, in particular from 4 to 7, when R is methyl. In addition to the repeating units of the formula (II), the polymers prepared according to the invention may also contain a minor amount, usually less than 40%, in particular not more than 20%, of other repeating units, for example alkyl acrylate, alkyl methacrylate and in particular acrylic acid and/or methacrylic acid units.

The weight average molecular weight of the poly(meth)acrylates containing carbazolyl side groups and prepared according to the invention is usually from 20,000 to 300,000, in particular from 50,000 to 200,000.

The said poly(meth)acrylates have good photoconductivity and, because of their other properties, can advantageously be used for the production of solid, photoconductive layers, in particular in electrophotographic recording elements. For use in electrophotographic offset printing plates, it is particularly advantageous that the said poly(meth)acrylates can contain, in addition to the repeating units of the general formula (II), also repeating acrylic acid and/or methacrylic acid units in an amount such that the resulting products have sufficient solubility in alkalis, as is desirable and necessary during washout of exposed electrophotographic offset printing plates with alkaline developers.

The photoconductive layers formed from the poly(meth)acrylates containing carbazolyl side groups and prepared according to the invention are solid at room temperature, flexible, nonbrittle and nontacky. They exhibit good adhesion to metallic surfaces, so that they can be applied directly to the substrates of electrophotographic recording elements without the use of an additional adhesion promoter or of an additional adhesion-promoting layer, even in electrophotographic recording elements which are subjected to high bending stress during their use, for example when clamped on drums or cylinders. The said poly(meth)acrylates are therefore very suitable as photoconductors for use in photoconductor layers of copying films or electrophotographic offset printing plates. The photoconductive layers can be produced from the said poly(meth)acrylates by conventional methods, for example by casting from solution and evaporating the solvent.

When they are used as photoconductors in photoconductive layers, the poly(meth)acrylates containing carbazolyl side groups and prepared according to the invention can be employed in the same way as, for example, poly-N-vinylcarbazole, together with dopants and/or sensitizers. The dopants and sensitizers conventionally used for poly-N-vinylcarbazole are suitable, for example electron acceptor materials capable of forming a charge transfer complex with the carbazole groups. Typical examples of these are Lewis acids, such as 2,4,7-trinitrofluorenone, 2,4,7-tetranitrofluorenone, chloranil and tetracyanoquinonedimethane. The suitable sensitizers include, for example, organic dyes which improve the spectral sensitivity of the photoconductive layer, as well as dyes and pigments which are capable of producing charge carriers under the influence of actinic light and of transporting these to the photoconductor with the aid of an electric field applied to the photoconductive layer from outside. Depending on the type of sensitizer used and on the field of use of the photoconductive layer or of the electrophotographic recording element, sensitization may be effected in a conventional manner, either homogeneously or heterogeneously. In the case of homogeneously sensitized photoconductive layers, the photoconductor and the sensitizer are present as a homogeneous mixture with one another in a single-stratum layer. In the case of heterogeneous sensitization, the photoconductive layer is a multi-stratum layer, in particular a two-stratum layer, i.e. a composite structure, a first stratum containing the sensitizer and a second stratum arranged on top being formed by the photoconductor.

For the single-stratum, homogeneously sensitized photoconductive layers, in particular the soluble organic dyes can be used as sensitizers in a conventional manner. Examples of these are the triarylmethane dyes, xanthene dyes, cyanine dyes, thiazine dyes and others. For the multi-stratum, heterogeneously sensitized photoconductive layers, on the other hand, organic pigments are preferably used for sensitization. However, inorganic materials which produce charge carriers under the action of light, for example selenium, are also suitable as sensitizers for the multi-stratum photoconductive layers. The dyes or pigments which are suitable as sensitizers for the heterogeneously sensitized multi-stratum photoconductive layers include azo dyes, phthalocyanines and isoindoline dyes. Dyes or pigments from the series consisting of the perylene-3,4:9,10-tetracarboxylic acid derivatives have proven particularly advantageous for sensitizing both homogeneously sensitized single-stratum and heterogeneously sensitized multi-stratum solid photoconductive layers. The sensitizers are present in the homogeneously sensitized single-stratum photoconductive layers in general in an amount of about 0.5-10% by weight, based on the photoconductive compound contained in the photoconductive layer.

In addition to the poly(meth)acrylates containing carbazolyl side groups and prepared by the novel process, as photoconductors, and any dopants and/or sensitizers for the said poly(meth)acrylates, the novel solid, photoconductive layers may additionally contain further components of the type usually used for photoconductive layers, for example polymeric binders, wetting agents, leveling agents, plasticizers or the like. A particular advantage of the solid, photoconductive layers formed using the photoconductors prepared according to the invention is that, owing to the particular properties of the poly(meth)acrylates containing carbazolyl side groups, prepared according to the invention and used as photoconductors, it is possible to dispense with the use of additional binders or plasticizers in the photoconductive layer, even when it is possible in principle to use these, and nevertheless to obtain solid, flexible layers having good adhesion to metallic substrate surfaces and good photoconductivity.

For the production of single-stratum, homogeneously sensitized, solid photoconductive layers, the poly(meth)acrylates containing carbazolyl side groups, prepared according to the invention and used as photoconductors are mixed with the sensitizers and any other additives used until a homogeneous mixture is obtained, and the latter is formed into a layer of the desired thickness. Advantageously, the components are mixed in solution in an organic solvent, and the layer is formed by applying the components from this solution to a substrate in such a way that, after the solvent has been evaporated in the air, a dry layer of from about 0.8 to about 40 μm thick results, the thickness depending on the intended use and being in particular from 0.8 to 6 μm in the case of electrophotographic printing plates and about 5-25 μm in the case of copying films.

The heterogeneously sensitized solid, photoconductive multi-stratum layers are produced in a conventional manner by a method in which the first stratum consisting of the sensitizer, for example selenium or an organic dye or pigment, is first produced on a substrate. The first stratum can be produced, for example, by applying the sensitizer to the substrate by vapor deposition or by casting from solution and evaporating the solvent. This first stratum of the heterogeneously sensitized solid, photoconductive multi-stratum layers generally has a thickness of from 0.005 to 5 μm, in particular from 0.1 to 1.5 μm. The second stratum consisting of the poly(meth)acrylates containing carbazolyl side groups and prepared according to the invention is then applied to this first stratum. This second stratum is advantageously formed by casting from a solution; its layer thickness when dry is usually from about 1 to 40 μm, preferably from 5 to 25 μm, in particular from 7 to 15 μm.

Because of their good flexibility, lack of tack at room temperature, the possibility of varying their solubility in alkalis, their good adhesion to metallic surfaces and other advantageous properties, the novel solid photoconductive layers consisting of the said poly(meth)acrylates are very suitable for use in electrophotographic recording elements, for example copying films, i.e. electrophotographic films for the copying sector, and in particular for the production of electrophotographic offset printing plates.

In the electrophotographic recording elements, the solid, photoconductive layers formed according to the invention are applied to an electrically conductive substrate. Suitable electrically conductive substrates for the electrophotographic recording elements are in principle all electrically conductive substrates as conventionally used for electrophotographic recording elements of the type under discussion. Depending on the field of use of the novel electrophotographic recording elements, preferred substrates are, for example, plastic films, preferably polyester films, e.g. films of polyethylene terephthalate or polybutylene terephthalate, coated with aluminum, tin, lead, bismuth or a similar metal by vapor deposition. Other suitable substrates for the said layers are electrically conductive special papers, and in particular panels, sheets or the like of metal, for example zinc, magnesium, nickel, copper or in particular aluminum. The metallic substrate panels or sheets, for example of aluminum, may be pretreated in a conventional manner, for example mechanically, chemically or electrochemically. In addition to flat, level substrates, cylindrical substrates, for example metal cylinders or cylinders having a metallic surface, are also suitable. For the production of the electrophotographic recording elements, the solid, photoconductive layers formed according to the invention are applied to the electrically conductive substrates in a conventional manner. This is preferably done simultaneously with the production of the solid, photoconductive layers, for example by producing these photoconductive layers from solution on the electrically conductive substrate.

As is usual for such recording elements, the electrophotographic recording elements according to the invention may contain, between the electrically conductive substrate and the solid, photoconductive layer or, in the case of recording elements having a multi-stratum photoconductive layer, also between the individual strata of the photoconductive layer, barrier layers, for example of metal oxides, such as alumina, polymers, e.g. polyamide, polyvinyl alcohol, polyacrylate or polystyrene, or similar systems.

The electrophotographic recording elements according to the invention have excellent performance characteristics. For example, not only is it possible to prepare novel electrophotographic offset printing plates in a very simple and advantageous manner for printing, but these plates also give excellent printed copies.

The Examples which follow illustrate the invention. In the Examples, parts and percentages are by weight, unless stated otherwise.

EXAMPLE 1

Preparation of poly-(6-N-carbazolylhexyl methacrylate)

200 ml of a solution of 9-borabicyclo[3.3.1]-nonane in tetrahydrofuran (0.5 mol/l) were initially taken in a thoroughly heated 500 ml three-necked flask. 100 mmol of N-(5-hexenyl)-carbazole in 100 ml of dry tetrahydrofuran were added dropwise. Thereafter, the mixture was stirred for 3 hours at room temperature and then 60 ml of ethanol, 20 ml of 6N sodium hydroxide solution and 40 ml of hydrogen peroxide (30% strength) were added in succession. The reaction mixture was then refluxed for one hour. It was then worked up by adding 200 ml of water and stripping off the tetrahydrofuran. The N-(6-hydroxyhexyl)-carbazole formed was extracted with ether and the ether extract was dried and evaporated. The resulting crude product was then recrystallized from 9:1 hexane/acetone. The N-(6-hydroxyhexyl)-carbazole was obtained in the form of white crystals in a 60% yield and had the following product characteristics:

IR (KBr): 3270 cm$^{-1}$ (—OH), 1620, 1590, 745, 720 cm$^{-1}$ (carbazole)

$^1$H-NMR (CDCl$_3$): δ=1.3–1.6 (m), 1.8–2.0 (m), 3.61 (t), 4.33 (t), 7.2–7.3 (m), 7.4–7.55 (m), 8.1–8.2 (m) Intensity ratio: 6:2:2:2:2:4:2

In a three-necked flask, 15 mmol of the N-(6-hydroxyhexyl)-carbazole prepared above, in 20 ml of dry tetrahydrofuran, were added to 7.5 ml of butyllithium (1.6 molar solution in hexane). Thereafter, 10 mmol of polymethyacryloyl chloride in 15 ml of tetrahydrofuran were added and the reaction solution was stirred at room temperature for 3 hours. The reaction mixture was worked up by pouring it into 300 ml of methanol, filtering off the resulting poly-(6-N-carbazolylhexyl methacrylate) and, for further purification, recrystallizing it from tetrahydrofuran/methanol. The poly-(6-N-carbazolylhexyl methacrylate) obtained in 82% yield was characterized by elemental analysis, IR spectroscopy and gel permeation chromatography (GPC) as follows:

Elemental analysis:

|  |  | C | H | N | O |
|---|---|---|---|---|---|
| C$_{22}$H$_{25}$NO$_2$ (335,45)$_n$ | Calculated: | 78.77 | 7.51 | 4.18 | 9.54 |
|  | Found: | 77.56 | 7.40 | 4.29 | 10.4 |

IR (film): 1730 cm$^{-1}$ (ester), 1630, 1600, 750, 722 cm$^{-1}$ (carbazole)

GPC: The molecular weight determined by get chromatography (polystyrene standards) was 72,000 ($\overline{M}_w$: 125,000, $\overline{M}_n$: 44,000, $\overline{M}_w/\overline{M}_n$=2.8)

EXAMPLE 2

Preparation of poly-(11-N-carbazolylundecyl methacrylate)

In a three-necked flask, 15 mmol of N-(11-hydroxyundecyl)-carbazole, prepared similarly to the method stated in Example 1 and dissolved in 15 ml of dry tetrahydrofuran, were added to a solution of 8.1 ml of butyllithium (1.6 molar in hexane). Thereafter, 10 mmol of polymethacryloyl chloride in 15 ml of tetrahydrofuran were added and the reaction mixture was stirred at room temperature for 2 hours. The reaction mixture was worked up as described in Example 1. The poly-(11-N-carbazolylundecyl methacrylate) obtained in 75% yield had a weight average molecular weight of 130,000 and the following IR characteristics:

IR (film): 1730 cm$^{-1}$: (ester), 1630, 1600, 750, 720 cm$^{-1}$ (carbazole)

EXAMPLE 3

Preparation of poly-(6-N-carbazolylhexyl acrylate)

15 mmol of the N-(6-hydroxyhexyl)-carbazole prepared according to Example 1, in 15 ml of tetrahydrofuran, were added dropwise to a solution of 8.1 ml of butyllithium (1.6 molar solution in hexane). Thereafter, 4 ml of a solution of polyacryloyl chloride in dioxane (2.5 molar) were added and the mixture was stirred for 3 hours at room temperature. After this time, the acyl chloride band had completely vanished from the IR spectrum. For working up, the resulting poly-(6-N-carbazolylhexyl acrylate) was precipitated in ice cold methanol and then reprecipitated. The yield was 78%. The poly-(6-N-carbazolylhexyl acrylate) had the following IR characteristics:

IR (film): 1740 cm$^{-1}$ (ester), 1630, 1600, 750, 725 cm$^{-1}$ (carbazole)

EXAMPLE 4

Production of Electrophotographic Recording Elements

14% strength solutions in tetrahydrofuran were prepared from the polyacrylates or polymethacrylates containing carbazolyl side groups and prepared according to Examples 1 to 3. These solutions were filtered and then each cast, on substrate films coated with selenium by vapor deposition, in a thickness such that, after the layer had been dried, a 10 μm thick photoconductor layer resulted. The said substrate film was a polyethylene terephthalate film which was about 100 μm thick and had been coated on one surface with a thin aluminum layer by vapor deposition. A selenium layer about 1 μm thick was applied to the aluminum layer.

The photoconductive elements produced in this manner had good photoconductivity, were flexible and did not give rise to any adhesion problems, even with pronounced bending of the substrate film.

We claim:

1. A process for the preparation of acrylate and/or methacrylate polymers containing carbazolyl side groups, comprising the steps of
   (1) preparing polymers of acryloyl chloride and/or of methacryloyl chloride and
   (2) reacting the said polymers in solution with an alcoholate of an N-(ω-hydroxyalkyl)-carbazole, thereby obtaining the said acrylate and/or methacrylate polymers containing carbazolyl side groups, wherein, the reaction of the alcoholate with the (meth)acryloyl chloride polymer is carried out in such a way that, after the reaction, acyl chloride groups are still present in the polymer, and thereafter hydrolyzing the acyl chloride groups to carboxyl groups.

2. The process of claim 1, wherein an alkali metal alcoholate is used as the alcoholate.

3. The process of claim 1, wherein the alkyl radical of the N-(ω-hydroxyalkyl)-carbazole is of 2 to 11 carbon atoms.

4. The process of claim 1, wherein the alcoholate is a lithium alcoholate.

5. The process of claim 1, wherein an N-(ω-hydroxyalkyl)-carbazole where the alkyl radical is of 3 to 10 carbon atoms is reacted with a polyacryloyl chloride.

6. The process of claim 1, wherein an N-(ω-hydroxyalkyl)-carbazole where the alkyl radical is of 4 to 11 carbon atoms is reacted with a polymethacryloyl chloride.

7. The process of claim 4, wherein an N-(ω-hydroxyalkyl)-carbazole where the alkyl radical is of 3 to 10 carbon atoms is reacted with a polymethacryloyl chloride.

8. The process of claim 4, wherein an N-(ω-hydroxyalkyl)-carbazole where the alkyl radical is of 4 to 11 carbon atoms is reacted with a polymethacryloyl chloride.

9. The process of claim 3, wherein the alkyl radical is of 3 to 8 carbon atoms.

10. The process of claim 5, wherein the alkyl radical is of 3 to 6 carbon atoms.

11. The process of claim 6, wherein the alkyl radical is of 4 to 7 carbon atoms.

12. The process of claim 7, wherein the alkyl radical is of 3 to 6 carbon atoms.

13. The process of claim 8, wherein the alkyl radical is of 4 to 7 carbon atoms.

* * * * *